(12) United States Patent
Seifert

(10) Patent No.: US 9,428,115 B2
(45) Date of Patent: Aug. 30, 2016

(54) MOTOR VEHICLE SEAT/CONSOLE-SUPPORTED HANDBAG BARRIER

(71) Applicant: Catherine L. Seifert, Cincinnati, OH (US)

(72) Inventor: Catherine L. Seifert, Cincinnati, OH (US)

(73) Assignee: STERLING CAPITAL SERVICES, INC., Cincinnati, OH (US)

( * ) Notice: Subject to any disclaimer, the term of this patent is extended or adjusted under 35 U.S.C. 154(b) by 0 days.

(21) Appl. No.: 13/888,126

(22) Filed: May 6, 2013

(65) Prior Publication Data
US 2015/0144671 A1 May 28, 2015

Related U.S. Application Data

(60) Provisional application No. 61/702,810, filed on Sep. 19, 2012.

(51) Int. Cl.
*B60R 7/04* (2006.01)
*B60R 7/00* (2006.01)
*B60R 11/00* (2006.01)

(52) U.S. Cl.
CPC .............. *B60R 7/005* (2013.01); *B60R 7/043* (2013.01); *B60R 2011/0007* (2013.01); *Y10T 29/49826* (2015.01)

(58) Field of Classification Search
CPC ........... B60R 2011/0007; B60R 7/043; B60R 2011/0059; B60R 2011/0276; B60R 7/005; B60R 7/04; B60R 7/00; B60R 2011/0012; B60R 2011/0014; B60R 2011/0003; B60R 21/06; B60N 2002/4405; A01K 1/0272
USPC ......... 224/275, 572; 296/24.34, 37.8, 37.16; D12/415–416, 426

See application file for complete search history.

(56) References Cited

U.S. PATENT DOCUMENTS

| | | | | |
|---|---|---|---|---|
| D432,075 S | * | 10/2000 | Hassett et al. | D12/416 |
| 6,962,382 B2 | * | 11/2005 | Scarlett | 296/24.46 |
| 7,677,662 B2 | * | 3/2010 | Thompson | 297/223 |
| 8,251,443 B1 | * | 8/2012 | Hahn et al. | 297/188.18 |
| 2001/0011664 A1 | * | 8/2001 | Meritt | 224/275 |
| 2005/0092793 A1 | * | 5/2005 | Berggren | 224/275 |
| 2006/0272968 A1 | * | 12/2006 | Swaim et al. | 206/320 |
| 2006/0283899 A1 | * | 12/2006 | Hill | 224/275 |
| 2008/0231063 A1 | * | 9/2008 | Bowers | 296/1.07 |
| 2009/0039128 A1 | * | 2/2009 | Damico | 224/572 |

* cited by examiner

*Primary Examiner* — Justin Larson
*Assistant Examiner* — Scott McNurlen
(74) *Attorney, Agent, or Firm* — Jenei LLC

(57) ABSTRACT

A barrier apparatus ("car cache' for purses" or "handbag hammock") has a substrate sized to approximately traverse a space between a pair of front seats and slightly behind a front center console of a motor vehicle. Straps attached to corners of the barrier apparatus are attachable respectively to an upper portion of each front seat and to the console, holding the barrier in place to receive a purse/handbag or similar small article.

1 Claim, 6 Drawing Sheets

MOTOR VEHICLE SEAT/CONSOLE-SUPPORTED HANDBAG BARRIER

CROSS-REFERENCE TO RELATED APPLICATIONS

This application claims the benefit of priority to U.S. Provisional Patent Application Ser. No. 61/702,810, filed Sep. 19, 2012, which is hereby incorporated herein by reference in its entirety for all purposes.

BACKGROUND OF THE INVENTION

1. Field of the Invention

The field of art disclosed herein pertains to storage inside of a motor vehicle, and more particularly to structures for receiving a purse/handbag or other small portable item of a driver or passenger in a motor vehicle.

2. Description of the Related Art

Drivers of a motor vehicle may have a portable item to which access is necessary while travelling. For example, a handbag or purse may contain money needed for a tollbooth. When a passenger is sitting in the other front seat, there is not a convenient place to store such a handbag without interfering with the legroom or arm room of the front or back seating area. Even when there is not another passenger in the car, the purse/handbag is usually out of reach of the driver as well as very susceptible to spilling its contents.

In one attempt to address this issue, a hanger device is attached to the armrest posts or back seat. Handles of a purse/handbag are hung on the hanger device. Such an arrangement may prove to be annoying to the occupant of one of the seats as the handbag tends to swing. Access to the bag's contents during travel may be difficult as the bag would tend to be closed in this orientation or out of reach.

In another attempt to address this issue, it is known to hang a bag between the two front seats by using the respective headrests as points of attachment. However, the size of the bag and the required top entry point constrains access and imposes limits on what may be stored. In addition, such a hanging bag may still interfere with use of a console between the seats, such as for an armrest. The hanging bag may be bulky, taking up considerable space even when not in use.

SUMMARY OF THE INVENTION

In one aspect, the present disclosure provides a barrier apparatus having a substrate sized to approximately traverse a space between a pair of front seats and slightly behind a console of a motor vehicle. A first strap is attached at one end to a first lateral side of an upper portion of the substrate and having a second end attachable to one of the pair of front seats. A second strap is attached at one end to a second lateral side of the upper portion of the substrate and having a second end attachable to another of the pair of front seats. A third strap is attached at one end to the first lateral side of a lower portion of the substrate. A fourth is strap attached at one end to the second lateral side of the lower portion of the substrate. Another end of each of the third and fourth straps respectable is attachable to one another to engage a console lid of the console.

In another aspect, the present disclosure provides a barrier apparatus having a substrate sized to approximately traverse a space between a pair of front seats and slightly behind a console of a motor vehicle. At least one first strap is attached at one end to a first lateral side of an upper portion of the substrate and having a second end attachable to one of the pair of front seats. At least one second strap is attached at one end to a second lateral side of the upper portion of the substrate and having a second end attachable to another of the pair of front seats. At least one strap attachable to each bottom lateral side of the substrate and to a console of the vehicle that is positioned between the pair of front seats. In an exemplary aspect, a carabiner clip is attached to each second end of the first and second straps. A cinch fastener is adjustably attached to a pair of bottom straps or cords such a lanyard braid.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

The present innovation relates generally to a device that serves as a barrier to prevent a purse/handbag or similar portable article from sliding rearward off of a console between front seats of a motor vehicle. In an exemplary aspect, the device pouches in a way to support the purse/handbag behind the arms of a driver or front passenger of the motor vehicle. The cradling of a rearward portion of the purse/handbag accommodates purse/handbags of various sizes and various orientations.

In particular aspect, the present innovation disclosed herein can pertain to storage inside of a motor vehicle (i.e. car, truck, and/or automobile) and more particularly to automobile interior structures especially adapted for holding personal items like a purse/handbag or other small, portable items (i.e. briefcases, laptop/notebook computers, PDAs, wallets, watch, gloves, hats, jewelry, makeup, eyeglasses, sunglasses, cell phones, portable electronics, music players, thermal mugs, food, medicine, writing instruments, water bottles, soda bottles or cans, newspapers, magazines, books, letters, maps, packages, and binders) of a driver or passenger in a motor vehicle.

The device thus serves as a "car cache' for purses" or a "handbag hammock", providing a very convenient way for purses/handbags to be stored securely in an automobile and out of the passengers' way, while providing easy access to the purse/handbag's contents. The car cache'/handbag hammock also provides a great way to keep the purse/handbag clean and in its proper shape for a much longer period of time, reducing the need to be replaced because the purse has become dirty from shoes and the car's floors, or its shape has been distorted due to being stepped upon. Additionally, the car cache'/handbag hammock eliminates the need for drivers to stretch their muscles to grab the purse off the floors, reaching across the far side of the passenger seat, or gathering the spilled contents across the seats or floors. In addition, it helps to provide a more comfortable riding environment for passengers that normally would have to maneuver their feet around the purse/handbag on the floor. Ultimately, the car cache'/handbag hammock will reduce driving stress/distractions, provide a more comfortable riding environment for all passengers, as well as save women money by avoiding early replacement of expensive purses.

The car cache'/handbag hammock may be made out of a variety of heavy duty fabrics including polyester, polypropylene, nylon, and/or leather type 'netting' materials and secured between three objects in the car: 1) under the driver's headrest; 2) under the front seat passenger's headrest; and 3) under the lid of the center front console.

Figure 1:
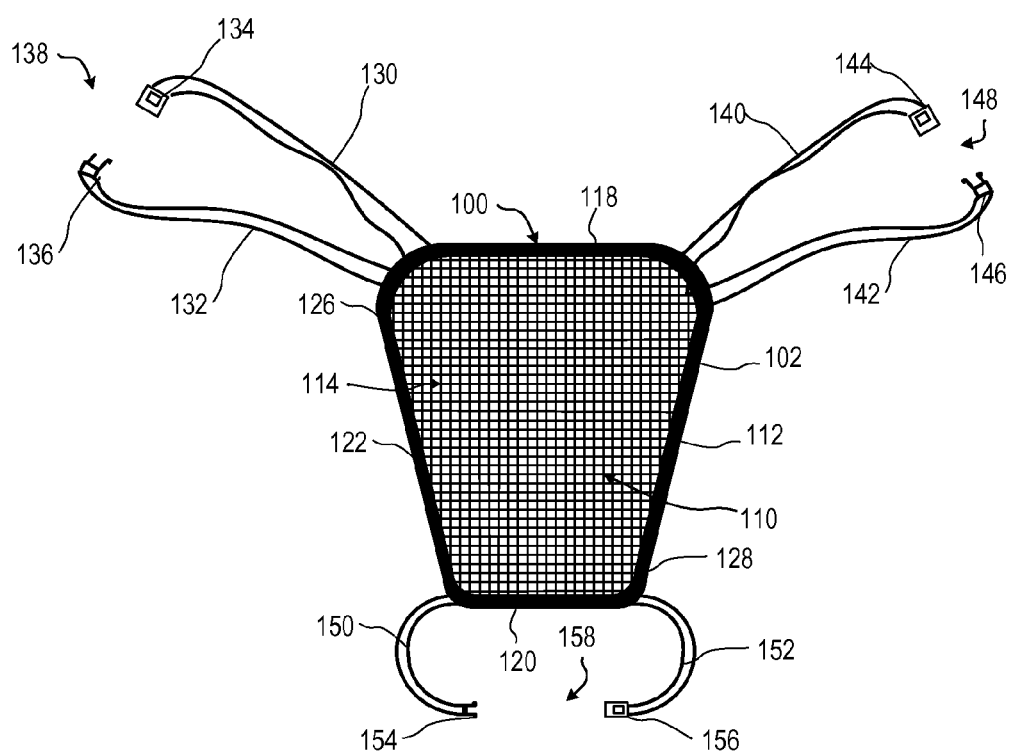
FIG. 1 depicts a diagram of a barrier apparatus according to one embodiment.
Figure 2:
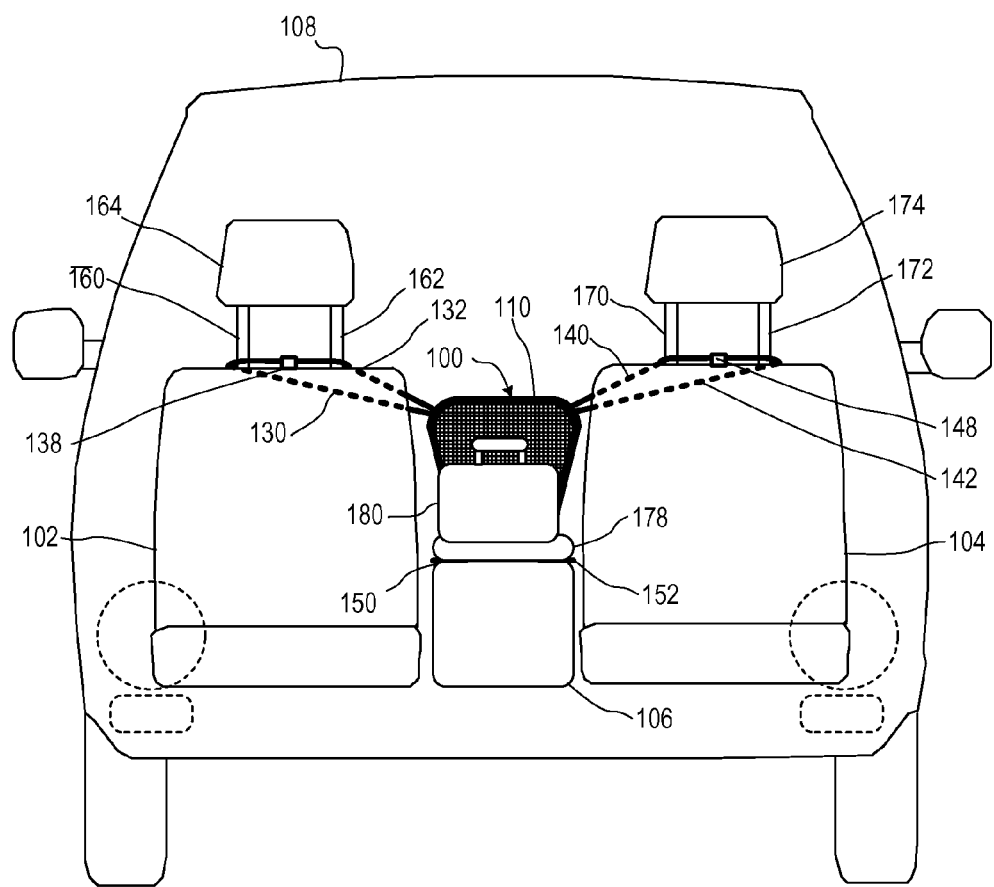
FIG. 2 depicts a front side view of the barrier apparatus attached between front seats and console of a motor vehicle.
Figure 3:
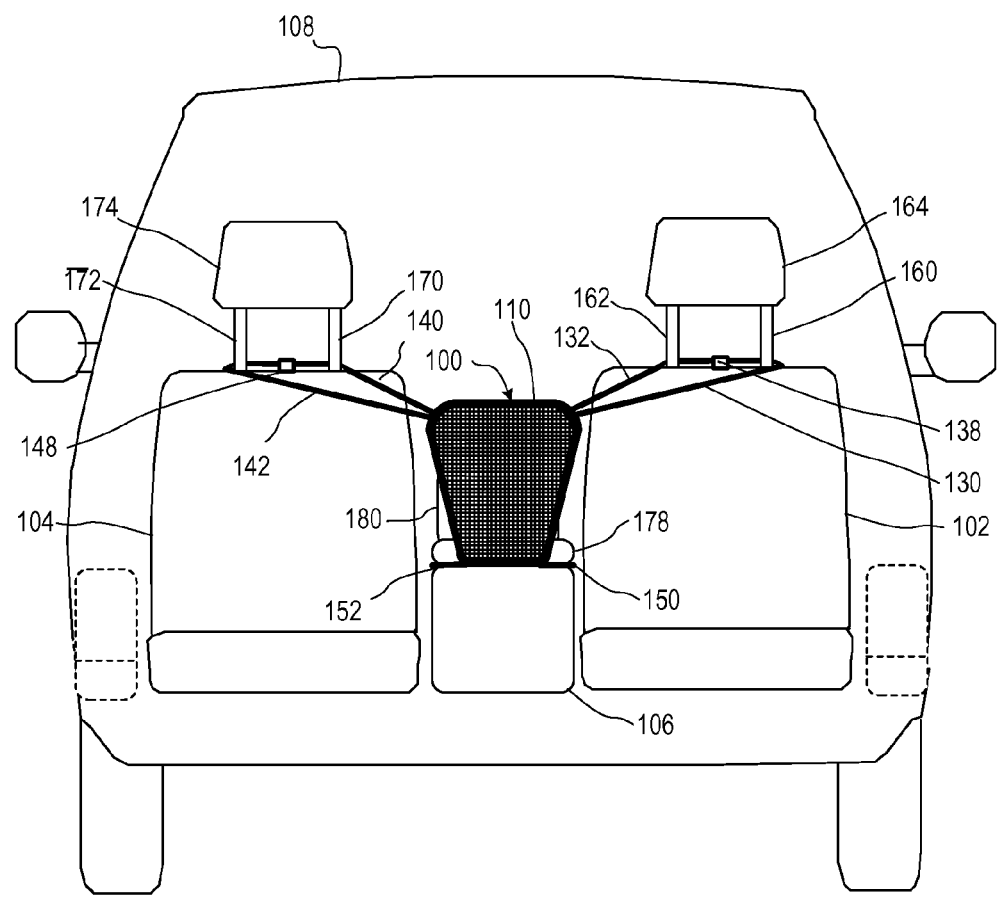
FIG. 3 depicts a rear side view of the barrier apparatus attached between the front seats and the console of the motor vehicle of FIG. 2.

Turning to the Drawings, wherein like numeral references indicate identical components throughout the several views, in FIGS. 1-4 a barrier apparatus 100 may be readily attached and detached from a right front seat 102, left front seat 104, and console 106 of a motor vehicle 108 (FIGS. 2-3). A substrate 110 is sized to approximately traverse a space between the front bucket seats 102, 104 and above the console 106 of the motor vehicle 108.

With particular reference to FIG. 1, an exemplary embodiment of the substrate 110 has an outer reinforced fabric band 112 for strength attached to a rounded trapezoidal piece of netting 114 having parallel upper and lower sides 118, 120 and lateral sides 122, 124 that converge top to bottom. For instance, the substrate 110 may be approximately 12" high by 13" wide across an upper portion 126 and 6" wide across a lower portion 128. A range of sizes may be provided for different vehicle seat spacing configurations. A first pair of straps 130, 132 is attached at one end to the first lateral side 122 of the upper portion 126 of the substrate 110. Another end of each of the first pair of straps 130, 132 terminate respectively in a male portion 134 and female portion 136 of a side release buckle 138. A second pair of straps 140, 142 is attached at one end to the second lateral side 124 of the upper portion 126 of the substrate 110. Another end of each of the first pair of straps 140, 142 terminate respectively in a male portion 144 and female portion 146 of a side release buckle 148. A third pair of straps 150, 152 is attached at one end to the first lateral side 122 and second lateral side 124 respectively of the lower portion 128 of the substrate 110. Another end of each of the first pair of straps 150, 152 terminate respectively in a male portion 154 and female portion 156 of a side release buckle 158.

With particular reference to FIGS. 2-3, the first pair of straps 130, 132 are attached to the right front seat 102, in particular encompassing right and left support posts 160, 162 of a headrest 164. The second pair of straps 140, 142 is attached to the left front seat 104, in particular encompassing right and left support posts 170, 172 of a headrest 174. The third pair of straps 150, 152 is attached under a console lid 178 of the center front console 106.

Figure 4:
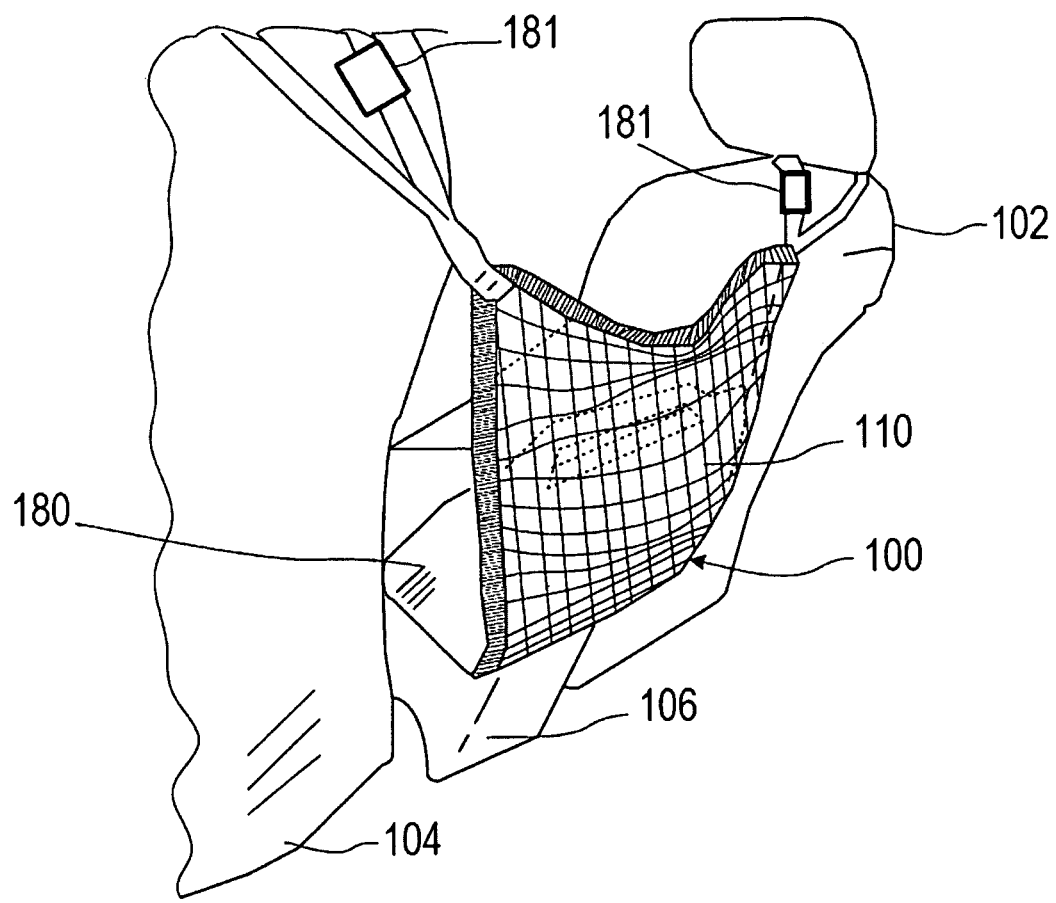
FIG. 4 depicts an isometric view of the barrier apparatus of FIGS. 2-3 as viewed from a vantage point of an occupant of a left backseat of the motor vehicle.

With particular reference to FIG. 4, a handbag or purse 180 is received against a front side of the barrier apparatus 100. The handbag or purse 180 may be securely held in the barrier apparatus 100 ("car cache' for purses" or "handbag hammock") in the up-right position. The handbag or purse 180 may be open for very easy access to its contents. The top of the netting 114 may be above the height of a center strap of the handbag or purse 180. The side release buckles 138, 148, 158 may be readily unbuckled and buckled again when use of the barrier apparatus is desired. It should be appreciated that an adjustment buckle 181 on one or more pairs of straps 130, 132, 140, 142, 150, 152 may allow for different dimensions of spacing between seats 102, 104, and console 106 as well as providing a sufficient degree of rearward pouching, securing the handbag or purse 180.

Thereby, the barrier apparatus 100 ("car cache' for purses" or "handbag hammock") will remove the need for the handbag or purse 180 to be placed on the floor by any of the passengers' feet. It eliminates the need for the driver to lean over to either the front passenger or backseat floors or stretching to grasp it on the backseat, where it often times slides out of reach with spilled contents. The barrier apparatus 100 will remove the challenge of keeping passengers' dirty shoes off of their purse as well as having the handbag sliding around the filthy/unsanitary floor with its contents falling out. The car cache'/handbag hammock will certainly save women additional driving stress as well as money by avoiding replacing dirty, misshapen bags sooner than required.

Figure 5:
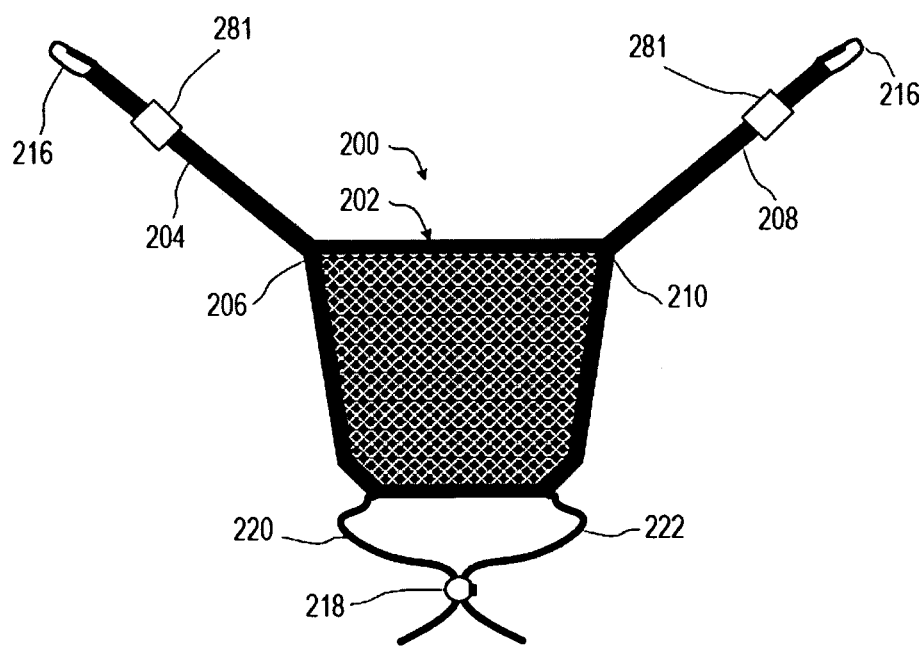
FIG. 5 depicts a front view of an alternative barrier apparatus according to another version of the present disclosure.

In FIG. 5, a barrier apparatus 200 ("car cache' for purses" or "handbag hammock") has a substrate 202 sized to approximately traverse a space between a pair of front bucket seats and slightly behind a console of a motor vehicle. A first strap 204 (attachment strap) is attached at one end to a first lateral side of an upper portion of the substrate 202 as depicted at 206 and having a second end attachable to one of the pair of front bucket seats. A second strap 208 is attached at one end to a second lateral side of the upper portion of the substrate 202 as depicted at 210 and having a second end attachable to another of the pair of front bucket seats. A pair of bottom straps 212, 214, which for example are lanyard braids, are attached respectively at one end to the first lateral side and second lateral side of a lower portion of the substrate 202 adjustably attachable to each other. For example, the cords may be cinched/tied in a knot. In an exemplary aspect, a carabiner clip 216 is attached to each second end of the first and second straps 204, 208. A cinch fastener 218 is adjustably attached to the pair of bottom straps 216, 218. Alternatively a single bottom strap, such as bottom strap 216, may encircle a console lid and be attached to an opposite bottom corner of the substrate 200 (not shown). An adjustment buckle 281 on one or more pairs of straps 204, 208 may allow for different dimensions of spacing between seats and console as well as providing a sufficient degree of rearward pouching, securing the handbag or purse.

In an exemplary aspect, the substrate 200 of netting is approximately 14" high and 16.5" wide at its widest point (i.e. the top) narrowing down to approximately 9" wide at its narrowest point (i.e. the bottom). The first and second straps for the headrests are approximately 1" wide×20" long (including 2" carabineer or connector) and allow for easy adjustment for storing most sizes of handbags. The lanyard braids are approximately ⅜" wide by 15" long and are used to secure the barrier apparatus 200 to the center console.

For example, the substrate 200 can be made of sturdy fabrics including polyester, polypropylene, nylon, and/or leather type 'netting' materials (i.e. materials often used for pet screens and beach totes). It is machine washable (except the leather) in a cool delicate cycle (no chlorine bleach), tumble dry low, and can be ironed using a warm temperature iron.

Figure 6:
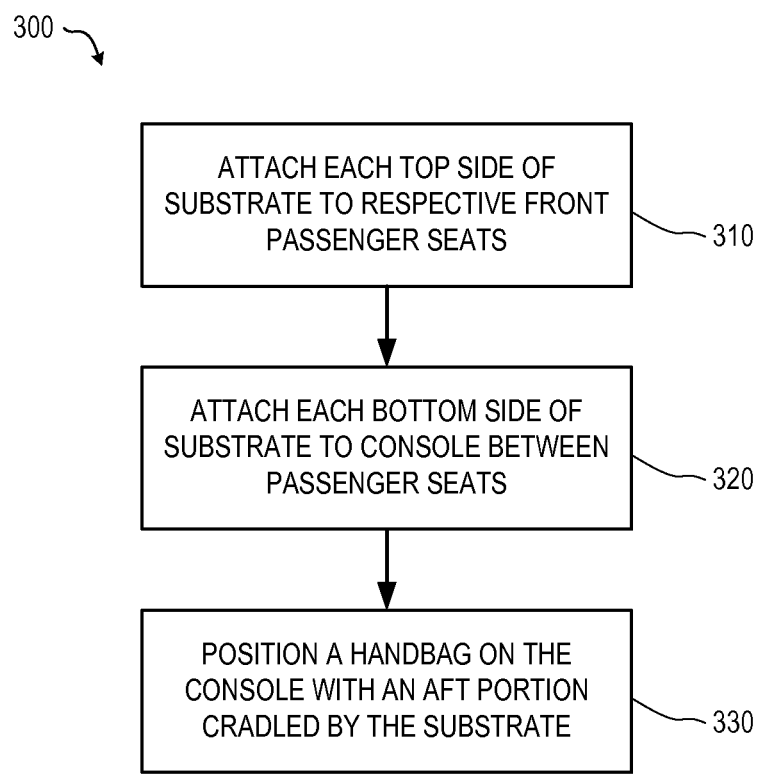
FIG. 6 depicts a flow diagram of a method of stowing a handbag between front seats of a vehicle as to be accessible to a driver of the vehicle according to at least one aspect of the present disclosure.

With reference to FIG. 6, a method 300 is provided for stowing a purse/handbag in a motor vehicle for driver accessibility. A user attaches each top lateral side of a substrate to a respective front passenger seat of a vehicle (block 310). The user attaches each bottom lateral side of the substrate to a console that is between the two front passenger seats (block 320). The user positions a purse/handbag on the console with an aft portion cradled by the substrate (block 330).

It should be appreciated that the present innovation can also be used in vehicles having second or third row bucket seats that are separated by a console.

By virtue of the foregoing, the driver need not strain to get to the contents of the purse/handbag since the barrier apparatus enables the handbag or purse to be stored up-right and open for easy access to its contents. The open sided nature of the barrier apparatus may accommodate most purses/handbags, for instance, yet cradling such purses/handbags for reliable support. The barrier apparatus also prevents discomfort to any backseat passenger or a passenger sitting in the other front seat. Although not all inclusive, below is a summary list of some benefits that can be associated with using the invention:

1. Affords safe and quick access to the purse/handbag's contents for women while they drive.

2. Greatly reduces driving distractions and stress by providing easy access to the purse/handbag's contents from the top of the car's center front console.

3. Omits the need for the driver to lean over to the front passenger floor, the backseat floor, or stretching to grasp the purse/handbag on the backseat 4. Eliminates the frequent situation where the purse/handbag slides out of reach and/or the contents spill out of the purse.

5. Secures the purse/handbag completely out of the way from both the front and back passengers; thus, providing a more comfortable riding environment for all passengers that normally have to maneuver their feet/legs around the purse/handbag while it is on the vehicle's floor.

6. Accommodates most types of non-commercial vehicles with a center front console due to its flexible design and can be installed in less than 60 seconds.

7. Keeps the purse/handbag off the floor and dirt-free, eliminating the need for cleaning off dirt from passengers' shoes and car floors.

8. Helps maintain the purse/handbag's proper form for a longer period of time, reducing the need for early replacement because the purse's shape has been distorted from passengers stepping on it.

9. Affords women with medical conditions (i.e. arthritis, joint issues, breast cancer, etc.) a less arduous way to gain access to the contents of their purse/handbag without painful stretching.

10. Reduces the ability of someone to reach into a stationary car and steal the purse/handbag from the front seat.

11. Reduces the chance of leaving home without the purse/handbag; due to the clear visibility of the barrier device once the driver gets in the vehicle, one can easily see they forgot their purse.

In summary, the invention solves an "age old" problem for drivers, especially women, by providing an extremely convenient, cost effective way to store their purses/handbags securely in their automobile while providing easy access to the purse/handbag's contents while driving.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. An apparatus for conveying a passenger and an accessible personal item, comprising:

a pair of front seats separated by a console having a console lid;

an article placed on the console lid;

an open-sided, single substrate approximately traversing a space between the pair of front seats and forming a relaxed portion in contact with and bulging behind the console to provide a degree of rearward pouching, the substrate receiving and cradling a rearward portion of the article placed on the console and securely holding the article in an up-right position;

at least one first strap attached at one end to a first lateral side of an upper portion of the substrate and having a second end attachable to one of the pair of front seats;

at least one second strap attached at one end to a second lateral side of the upper portion of the substrate and having a second end attachable to another of the pair of front seats;

right and left bottom straps attached to each bottom lateral side of the substrate and extending under respective lateral sides of the console lid of the vehicle that is positioned between the pair of front seats to form a receptacle comprised of a top surface of the console, inward opposing sides of the pair of front seats, and the relaxed portion of the substrate, wherein each of the at least one first and second straps comprises a lengthwise adjustment mechanism; and a cinch fastener adjustably cinching the right and left bottom straps to an underside of the console lid to adjust an amount of pouching of the relaxed portion of the substrate and to draw each lateral side of the substrate into proximity of an upper surface of the console lid, wherein adjustment of the at least one first and second straps and adjustment of the cinch fastener create slack in lateral sides of the substrate respectively between the at least one first and second straps and the right and left bottom straps to enable the substrate to bulge behind the console to create the rearward pouching.

* * * * *